United States Patent Office 2,995,885
Patented Aug. 15, 1961

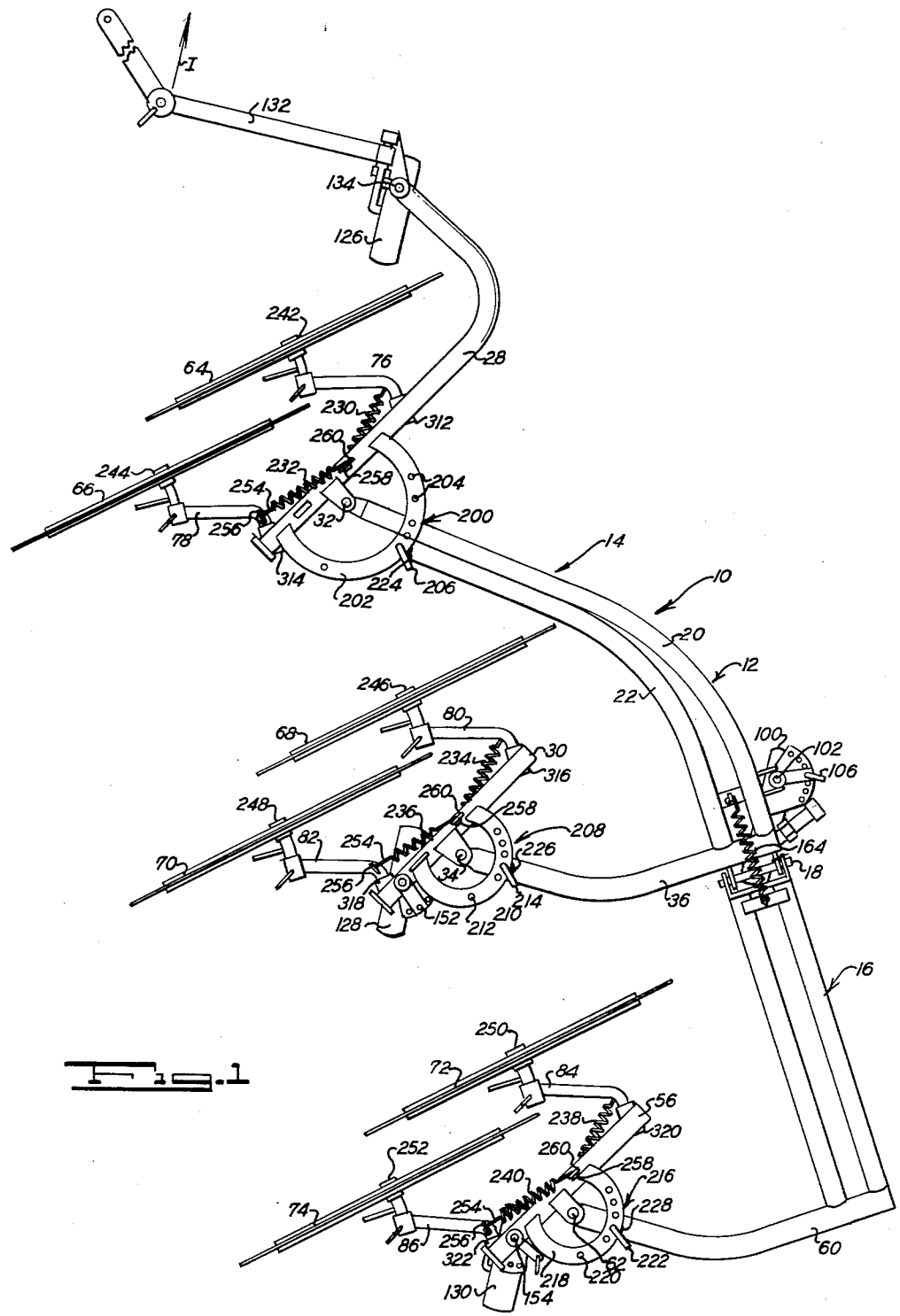

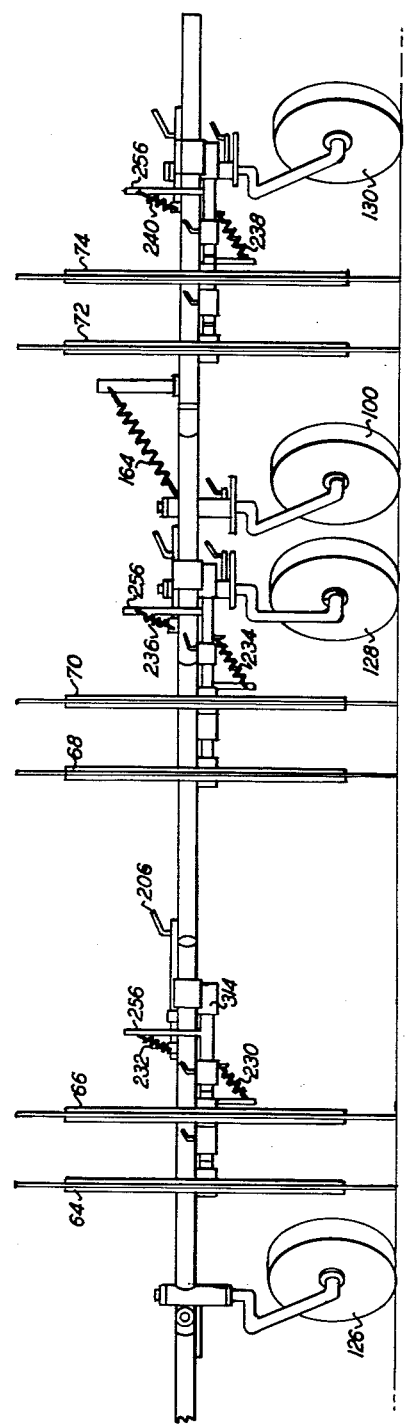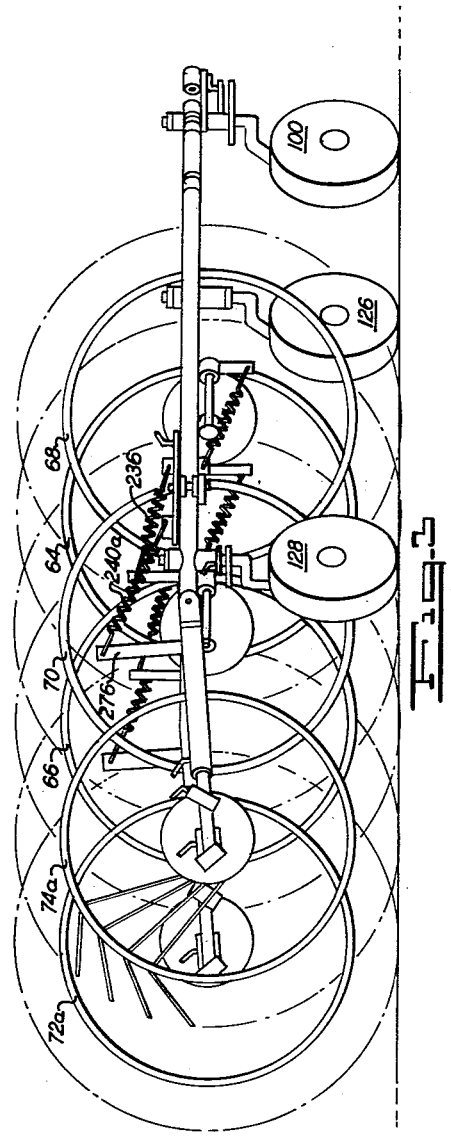

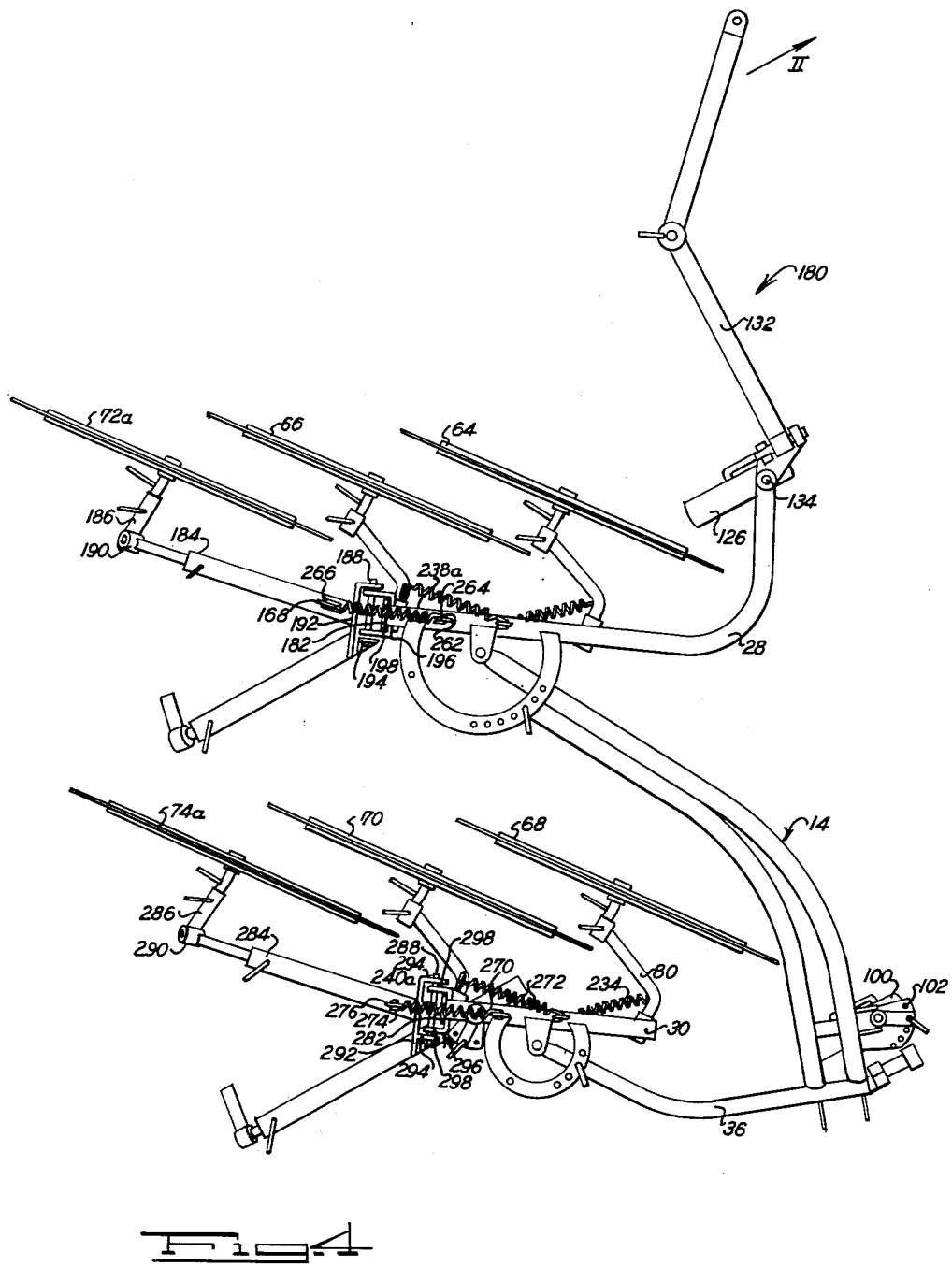

2,995,885
ROTARY WHEEL TEDDER AND SWATH TURNER
Cornelis van der Lely and Ary van der Lely, Maasland, Netherlands, assignors to C. van der Lely N.V., Maasland, Netherlands, a limited company of the Netherlands
Filed Sept. 30, 1957, Ser. No. 686,941
Claims priority, application Netherlands Dec. 1, 1956
9 Claims. (Cl. 56—365)

This invention relates to devices for turning crop lying on the ground and of the type which, for example, comprises a frame and a plurality of rake wheels, each of the rake wheels being mounted on the frame so as to be rotatable about an axle, the frame being provided with a draw-bar on which a driving force can be exerted.

Known devices to which the present invention relates, comprise, for example, rake wheels which may be turned about vertial axes relative to a frame in order to adjust the device in accordance with the distance between the swaths to be turned. After the rake wheels have been turned about the vertical axes in the prior art devices, the position of the line of resistance of the rake wheels relative to the frame of the device is changed. Since with these prior art devices the draw-bar on which the driving force is exerted is rigidly secured to the frame, the position of the traction point on the draw-bar will change relatively to the line of resistance, when the rake wheels are turned.

In order to maintain a favorable position of the traction point relative to the line of resistance, the present invention proposes that the rake wheel support be fixed to the frame at different places.

An object of the invention is to avoid the change in the position of the traction point occurring when the rake wheels are turned.

Another object of the present invention is the provision of a draw-bar which is coupled to at least one of the rake wheels so as to be rotatable together with the rake wheel about the vertical axis, about which the rake wheel itself is rotatable.

Still another object of the present invention is the provision of a draw-bar which lies at substantially the same level as the hubs of the rake wheels.

A further object of the present invention is the provision of a device which can be easily converted from a swath-turning device into a raking device or side delivery rake. When the rake wheel is turned so as to revolve relative to the vertical axis, the draw-bar will also turn with the rake wheel about the vertical axis, so that the draw-bar always occupies a favorable position relative to the line of resistance. The line of resistance is determined by the positions of the rake wheels and the forces required to obtain a satisfactory raking effect engaging the device on a suitable level owing to the disposition of the arm at the height of the hubs of the rake wheels.

The present invention provides for a simple and advantageous construction by providing the device with a support for one or more rake wheels; this support is connected to the frame by means of a vertical axis, and at least one rake wheel and the draw-bar are associated with the same support. Here, a plurality of rake wheels may form one group to turn a strip of crop and can be arranged on one support; and, a complete group of rake wheels can be moved at once into the correct position relative to the frame. The tractive force is applied to the support by extending the support in a horizontal plane around a rake wheel, the draw-bar being connected to a portion of the support which lies in front of the rake wheels, relative to the intended direction of travel of the device, so that this support can be made as light as possible.

In order to steer the device easily, the support is supported near the draw-bar in front of the rake wheels by a ground wheel, which is connected to the draw-bar so that this ground wheel operates as a steering wheel. Since satisfactory swath-turning is obtained by means of a group of two rake wheels, it is usually preferable to provide two rake wheels on one support. However, it often occurs that a group of three rake wheels is required to turn large swaths, so that it is advantageous to extend the support by means of an auxiliary support, on which a third rake wheel can be provided so as to enlarge the swath-turning group.

In general, a satisfactory operation of the device requires the rake wheels to be fastened to a support by means of cranks, so that the rake wheels are movable in a vertical direction relative to the frame.

In order to be able to convert easily the device from the position in which groups of two rake wheels are employed into a position in which groups of three rake wheels are employed, the auxiliary support is connected to the main support in a manner such that the auxiliary support if freely movable during operation in a vertical direction relative to the main support, whereby the advantage is obtained that, when a rake wheel is moved to the auxiliary support, the crank associated with this rake wheel need not be displaced.

In order to reduce the pressure of the rake wheel of the auxiliary support on the ground it is advantageous to transfer in a resilient manner at least part of the weight of the auxiliary support with the rake wheel to the main support by means of a spring. The frame of the device lies in a substantially horizontal plane so that a favorable load on all parts is insured, when the frame lies at substantially the same height as the hubs of the rake wheels. It is advantageous that the supports to which the rake wheels are secured lie mainly behind the rake wheels, when viewed in the intended direction of travel of the device, so that when the device is in operation the crop engaging the front side of the rake wheel does not contact these supports. Also, as mentioned hereinbefore, the frame lies at substantially the same height as the hubs of the rake wheels. In order to obtain a most favorable load on all parts of the frame when the frame has more than two supports, it is advantageous to provide each support with a ground wheel.

For a better understanding of the invention, and to show how the same may be carried into effect, reference will now be made to the accompanying drawings, in which:

FIG. 1 is a plan view of a crop-turning device shown in a first working position in which the rake wheels are arranged in three groups of two;

FIG. 2 is a side view of the device shown in FIG. 1;

FIG. 3 is a side view of the device shown in FIG. 4;

FIG. 4 is a plan view of a modification of the device shown in FIGS. 1 and 2, the modified device being shown in a second working position in which the rake wheels are arranged in two groups of three; and, Referring now to FIG. 1, the device 10 comprises a frame 12 comprising two frame portions 14 and 16, which are articulated or linked to one another by means of an axle or a horizontal bar 18. The coupling of frame portions 14 and 16 together is effected by means of axle 18 and a spring 164.

The frame portion 12 comprising elements 20, 22 and 36 carries two support members 28 and 30, which are rotatable about axles or pivot pins 32 and 34 which define axes formed by the center lines which pass through axles 32 and 34 and are perpendicular to the plane of the drawing. The aforementioned axes are also perpendicular to the plane defined by the support members 28 and 30, which is the plane of the drawing.

In order to lock the support 28 in different positions relative to the frame portion 14, the support 28 is provided with a locking mechanism 200 comprising a semi-circular strip 202, formed with holes 204 therein through which a locking pin 206 can be passed, and in order to lock the support in different positions relative to the frame portion 14, the support 30 is similarly provided with a locking mechanism 208 comprising a strip 210, formed with holes 212 through which a locking pin 214 can be passed. A further support member 56 is connected for rotation about an axle 62 or pivot pin which defines a vertical axis with respect to the frame portion 16, support 56 being similarly provided with a lock mechanism 216 comprising a strip 218 formed with holes 220 through which a locking pin 222 can be passed, whereby the support 56 may be locked in different positions relative to the frame portion 16. It will be understood that all the locking mechanisms 200, 208 and 216 are the same and operate in the same manner. Take for example, locking mechanism 200 in which the semi-circular strip 202 together with support 28 is rotatable about axle 32 so as to change the angular position of support 28, locking pin 206 can be placed in different holes 204 which are provided on strip 202. The locking pin 206 when placed in one of the holes 204 engages a reception device 224 in bar member 22, which together determine the angular position of the support 28. Similarly locking mechanisms 208 and 216 cooperate with reception devices 226, 228 associated with arms 36 and 60, respectively. The support 28 carries rake wheels 64 and 66, which are fastened to the support 28 by means of cranks 76 and 78, respectively in such a way as to be displaceable in a vertical direction relative to the support 28.

In order to transfer at least part of the weight of the rake wheels to the supports, the cranks 76 and 78 are provided with springs 230 and 232, respectively, which tend to raise the rake wheels from contact with the ground. The support 30 similarly carries rake wheels 68 and 70 by means of cranks 80 and 82 respectively, while the weight of these rake wheels is transferred at least partly to the support 30 by springs 234 and 236. The support 56 also carries rake wheels 72 and 74 by means of cranks 84 and 86, respectively, there being springs 238 and 240, for transferring at least part of the weight of these rake wheels to the support 56. In order that the supports 30 and 56 may have a minimum length, since the supports are at the same level as the hubs 242, 244, 246, 248, 250 and 252 of the rake wheels 64, 66, 68, 70, 72 and 74, respectively, the springs 236 and 240 are secured to the upper sides of the supports and the springs 234 and 238 are secured to the lower sides of the supports 30 and 56, respectively. The support 28, which also lies at the same level as the hubs of the rake wheels, is extended in a horizontal plane, that is the plane of the drawing, around the rake wheel 64 and, in front of the rake wheels, it supports a draw-bar 132, on which the tractive force can be exerted.

The connection of spring 232 will be described, and it will be understood that the other springs are similarly connected. One end 254 of spring 232 is coupled to a hook 256 on crank 78 and the other end 258 of spring 232 is coupled to a hook 260 on support 28. It will be understood that similar designations will be given to the spring ends together with their respective hook connections and, these connections are hidden from view for springs 230, 234 and 238 as seen in FIG. 1.

The support 28 is carried by a ground wheel 126, which is adapted to turn relative to the support 28 about a vertical shaft or pivot pin 134 which is connected to the draw-bar 132, so that the ground wheel 126 constitutes a steering wheel for the device. The support 30 is also carried by a ground wheel 128, which can be fixed in different positions relative to the support 30 by means of a locking pin 152, so that the ground wheel 128 determines the direction of travel of the device 10 and is capable of resisting at least part of the forces exerted laterally on the device. The support 56 is also carried by a ground wheel 130, which is rotatable relative to the support 56 about a vertical shaft or pivot pin 154, the wheel 130 being arranged to operate as a caster wheel. The frame 12 is furthermore supported by a ground wheel 100, which is connected to the bar member 20 of the frame portion 14, the ground wheel 100 being rotatable about a vertical pin or shaft 102 relative to the frame portion 14, and being capable of being fixed in different positions by means of a locking pin 106. The ground wheel 100 thus constitutes (in a similar manner to the ground wheel 128), a wheel which determines the direction of travel of the device 10 and which can also resist at least part of the forces exerted laterally on the device.

When the device 10 is moved in the direction of the arrow I, as shown in FIG. 1, by a tractive force exerted on the end of the draw-bar 132, the groups of rake wheels, each mounted on a respective support 28, 30 and 56, will individually work strips of crop lying on the ground. Since this device 10 has a comparatively great length, the frame 12 is divided into two frame portions or sections 14 and 16, which are linked to one another by means of a horizontal bar 18 so that, when the device 10 is used on uneven fields, the frame sections 14 and 16 can move relative to one another about the horizontal bar 18 in such a way that undue loads on the frame 12 are avoided and the rake wheels can readily adapt themselves to the unevenness of the field and the line of traction is applied at the draw-bar at the same level as the level of the hubs.

The rake wheels 64, 66, 68, 70, 72 and 74 are coupled by means of cranks 76, 78, 80, 82, 84 and 86 to the support members 28, 30 and 56. Cranks 76, 78, 80, 82, 84 and 86 are respectively coupled to supports 28, 30 and 56; by means of bushings 312, 314, 316, 318, 320, 322; in which said cranks are rotatable about an axis through the respective bushings for moving the respective rake wheels in a vertical direction relative to the ground in order to accommodate for the unevenness of the ground. Here, it is to be noted that the springs 230, 232, 234, 236, 238 and 240 assist the movement of the associated cranks.

Referring now to FIGURES 3 and 4, the device shown in FIGURES 1 and 2 is shown in a position in which it has been converted into a raking device 180 comprising two groups each of three rake wheels. For converting the device from the working position shown in FIGURES 1 and 2, into the working position shown in FIGURES 3 and 4, the rake wheels 72 and 74 have been displaced relative to the frame 12, and in this embodiment will be referred to as 72a and 74a, respectively. A plate 182 is secured to the support 28, and an auxiliary support 184 can be slid over the plate 182 in a simple manner. The auxiliary support 184 is provided with a bearing 186, in which the rake wheel 72a can be mounted. The support 30 is likewise provided with a flat plate 282 similar to plate 182, over which an auxiliary support 284 can be slid, the support 284 being provided with a bearing 286 for the rake wheel 74a. The auxiliary support 184 is rotatable relative to the support 28 about a horizontal bar 188 and at least part of the weight of the auxiliary support 184 and, as the case may be, part of the weight of the rake wheel 72a can be transferred to the support 28 by resilient means such as a spring 238a which tends to raise the rake wheel 72a from the ground. The auxiliary support 284 is similarly rotatable about a horizontal bar 288 relative to the support 30, and at least part of the weight of the auxiliary support 284 and the associated rake wheel 74a is transferred to the support 30 by resilient means such as a spring 240a, which tends to raise the rake wheel 74a from the ground. Spring 238a has one end 262 connected by means of a hook 264 positioned on support 28. The other end 266 of spring 238a is connected to auxiliary support 184 by means of a hook 268 positioned on the auxiliary support 184. Similarly, one end 270 of spring 240a is hooked to support 30 by means of hook 272 positioned on the support 30 and the other end 274 of spring 240a is hooked to the auxiliary support by means positioned thereon comprising a hook 276.

Bearings 186 and 286 are rotatably coupled to auxiliary supports 184 and 284, respectively by means of a pivoting device 190 and 290, respectively, coupling the associated bearing and auxiliary support.

As mentioned hereinbefore, auxiliary support 184 is rotatable relative to support 28 about horizontal bar 188. Coupled to auxiliary support 184 is a U-shaped member 192 having legs 194, 194 provided with openings for receiving horizontal bar 188. Similarly, support 28 is provided with a U-shaped member 196 having legs 198, 198 provided with openings for receiving horizontal bar 188 whereby support 28 and auxiliary support 184 are pivotally coupled together. It will be apparent that auxiliary support 284 is also provided with a U-shaped member 292 having legs 294, support 30 is provided with a U-shaped member 296 having legs 298, all of the legs being provided with openings for the reception of horizontal bar 288 whereby to enable auxiliary support 284 to pivot about support 30.

Subsequent to the displacement of the rake wheels 72a and 74a, the frame portion 16 of the device 10 as shown in FIGURES 1 and 2 may, if desired, be removed, so that the operation of the device in the position shown in FIGURES 3 and 4 is facilitated. In the working position shown in FIGURES 3 and 4, the support 28 and 30 are fixed reltive to the frame portion 14 in positions different from those shown in the working position shown in FIGURES 1 and 2. In the position shown in FIGURE 4, the device is drawn in the direction of the arrow II by means of the draw-bar 132 by means of any suitable conventional tractor (not shown). In order to maintain the direction of travel of the device in the direction of the arrow II, the ground wheels 100 and 128 have their planes rotated about their vertical pins 102 and 148, which define vertical axes, and are fixed in other positions relative to the frame portion 14.

The constructions described in FIGURES 1 and 2 can also be used as a side delivery rake for which purpose the draw-bar 132 may be connected to the same point of the frame 12 as in FIGURES 3 and 4. There is, moreover, the advantage that neither in its position as a side delivery rake, nor in its various positions as a swath turner, do the ground wheels of the device ride over the crop worked or to be worked, in spite of the fact that the device 10 or 180 has three ground wheels.

While there has been described what is at present considered to be the preferred embodiment of this invention, it will be obvious to those skilled in the art that various changes and modifications may be made therein without departing from the scope of the invention.

What we claim is:

1. A raking device including a frame, a support member coupled to said frame, a draw arm coupled to said support member for drawing said frame along the ground, a rake wheel adapted for processing crop lying on the ground, means coupling said rake wheel to said support member and including a locking mechanism operatively associated with said support member for locking said support member together with said draw arm to said frame in a plurality of locked positions and a rake wheel on said frame, said rake wheels being operatively associated in tedding relationship, the rake wheels each having an axis of rotation substantially at the same level as said frame.

2. A device according to claim 1, in which said locking device comprises a strip coupled to said support member and movable therewith, and a locking pin operatively associated with said strip, said strip having at least two holes therein for receiving said locking pin, and said frame being provided with a further hole for receiving the locking pin, said locking pin engaging one hole in the strip and the hole in the frame in one of said locked positions and said locking pin engaging the other hole in the strip and the hole in the frame for locking said support in a second of said locked positions.

3. A device according to claim 1, in which said support member extends partly substantially parallel to the rake wheel and lies partly in front of said rake wheel relative to the intended direction of travel of said device, the draw bar being connected to the part of said support member which lies in front of the rake wheel.

4. A device as claimed in claim 3, comprising a ground wheel on said draw bar, said ground wheel being coupled to said draw bar at the point of connection with said support member.

5. A device according to claim 1, wherein the rake wheel comprises a hub coupled to said support member, said draw bar being positioned in a predetermined position relative to the ground and said hub being positioned at the same level, whereby the traction force is applied to said rake wheel at a level defined by the axis of said hub.

6. A device according to claim 1, comprising another rake wheel operatively associated with said first mentioned wheel and constituting therewith a first group, another rake wheel operatively associated with said second mentioned rake wheel and constituting therewith a second group and a third group of two rake wheels operatively associated with said frame.

7. A device according to claim 6, including in addition to the first said support member, second and third support member coupled to the frame, said groups of rake wheels being coupled to said support members, and means to permit said rake wheels to move in a vertical direction relative to the ground for accommodating said rake wheels to any unevenness of the ground.

8. A device according to claim 7, said coupling means including a crank coupling each rake wheel to an associated support member.

9. A device according to claim 7, having a crank connecting each rake wheel of each group to the adjacent said support member, a first spring in each of said groups having one end attached to the lower portion of one of said cranks and the other end attached to the lower portion of the said adjacent support and a second spring in each of said groups having one end attached to the upper portion of the other of said cranks and the other end attached to the upper portion of the said adjacent support, said springs being effective for transferring at least part of the weight of said rake wheels to said associated support members.

References Cited in the file of this patent

FOREIGN PATENTS

| | | |
|---|---|---|
| 1,081,746 | France | June 9, 1954 |
| 162,242 | Australia | Mar. 29, 1955 |
| 1,124,097 | France | June 25, 1956 |
| 1,127,200 | France | Aug. 6, 1956 |